US012728473B2

(12) United States Patent
Massey, Jr.

(10) Patent No.: US 12,728,473 B2
(45) Date of Patent: Sep. 8, 2026

(54) SYSTEMS AND METHODS TO CONTROL WELDING PROCESSES USING WELD POOL ATTRIBUTES

(71) Applicant: Illinois Tool Works Inc., Glenview, IL (US)

(72) Inventor: Steven B. Massey, Jr., Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/094,600

(22) Filed: Nov. 10, 2020

(65) Prior Publication Data

US 2022/0143730 A1 May 12, 2022

(51) Int. Cl.

*B23K 9/095* (2006.01)
*B23K 9/10* (2006.01)
*B23K 9/12* (2006.01)
*B23K 37/02* (2006.01)
*B23K 9/32* (2006.01)

(52) U.S. Cl.

CPC .......... *B23K 9/0956* (2013.01); *B23K 9/1006* (2013.01); *B23K 9/125* (2013.01); *B23K 37/0247* (2013.01); *B23K 9/321* (2013.01)

(58) Field of Classification Search

CPC ........ B23K 9/09; B23K 9/095; B23K 9/0953; B23K 9/0956; B23K 9/1006; B23K 9/125; B23K 9/073; B23K 9/12; B23K 9/124; B23K 9/173; B23K 9/067; B23K 9/0732; B23K 9/0735; B23K 9/092; B23K 9/10

USPC .............................................. 219/130.5, 136

See application file for complete search history.

(56) References Cited

U.S. PATENT DOCUMENTS 3,341,686 A * 9/1967 Sidbeck ............... B23K 9/0731 219/60 R
4,611,111 A 9/1986 Baheti
4,613,743 A 9/1986 Nied
4,877,920 A 10/1989 Lush
5,061,841 A * 10/1991 Richardson .......... B23K 9/0956 219/130.01
5,481,085 A * 1/1996 Kovacevic ........... B23K 9/1274 219/130.21
8,354,608 B2 1/2013 Dave
9,266,182 B2 * 2/2016 Hung ....................... B23K 9/16
2013/0189658 A1 * 7/2013 Peters ..................... G06F 30/20 434/234
2016/0089751 A1 * 3/2016 Batzler ................ B23K 9/1087 434/234

(Continued)

*Primary Examiner* — Chris Q Liu

(74) *Attorney, Agent, or Firm* — McAndrews Held & Malloy, Ltd.

(57) ABSTRACT

Disclosed are systems and methods for controlling welding processes in real-time, or near real-time, as a function of a measured weld pool attribute. The welding-type system includes power conversion circuitry and control circuitry. The power conversion circuitry converts input power to welding-type power for use by a welding torch to form a weld pool. The control circuitry control one or more parameters of the welding-type system during a welding operation based on one or more attributes of the weld pool determined using a sensor configured to capture the one or more attributes of the weld pool. The one or more attributes may include, for example, a width of the weld pool and/or a depth of depression in weld pool.

20 Claims, 4 Drawing Sheets

(56) References Cited

U.S. PATENT DOCUMENTS

| | | | | |
|---|---|---|---|---|
| 2016/0193681 | A1* | 7/2016 | Pesme | B23K 9/1274 219/136 |
| 2016/0267806 | A1* | 9/2016 | Hsu | G09B 5/02 |
| 2016/0318130 | A1* | 11/2016 | Stempfer | B23K 10/006 |
| 2018/0345399 | A1* | 12/2018 | Fujiwara | B23K 9/124 |

* cited by examiner

SYSTEMS AND METHODS TO CONTROL WELDING PROCESSES USING WELD POOL ATTRIBUTES

BACKGROUND

Welding is a process that has increasingly become ubiquitous in all industries. Welding is, at its core, simply a way of bonding two pieces of metal. While there are other techniques of joining metal (e.g., riveting, brazing, and soldering, for instance), welding has become the method of choice for its strength, efficiency and versatility.

During a welding operation, the welding torch forms, via an arc, a molten weld pool on the welding work piece to which a filler material (e.g., welding wire) is added. As the welding torch travels along a welding work piece, the molten weld pool moves and forms a trail of solidified metal in the form of a weld bead. The weld pool measurements of the molten weld pool, together with other parameters such as travel speed and wire feed speed, dictates the size and shape of the resulting weld bead.

This disclosure relates generally to welding systems and, more particularly, to systems and methods to control welding processes using a measured weld pool attribute.

SUMMARY

The present disclosure relates generally to welding systems and, more particularly, to controlling welding processes in real-time, or near real-time, as a function of a measured weld pool attribute, substantially as illustrated by and described in connection with at least one of the figures, as set forth more completely in the claims.

DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

Figure 1:
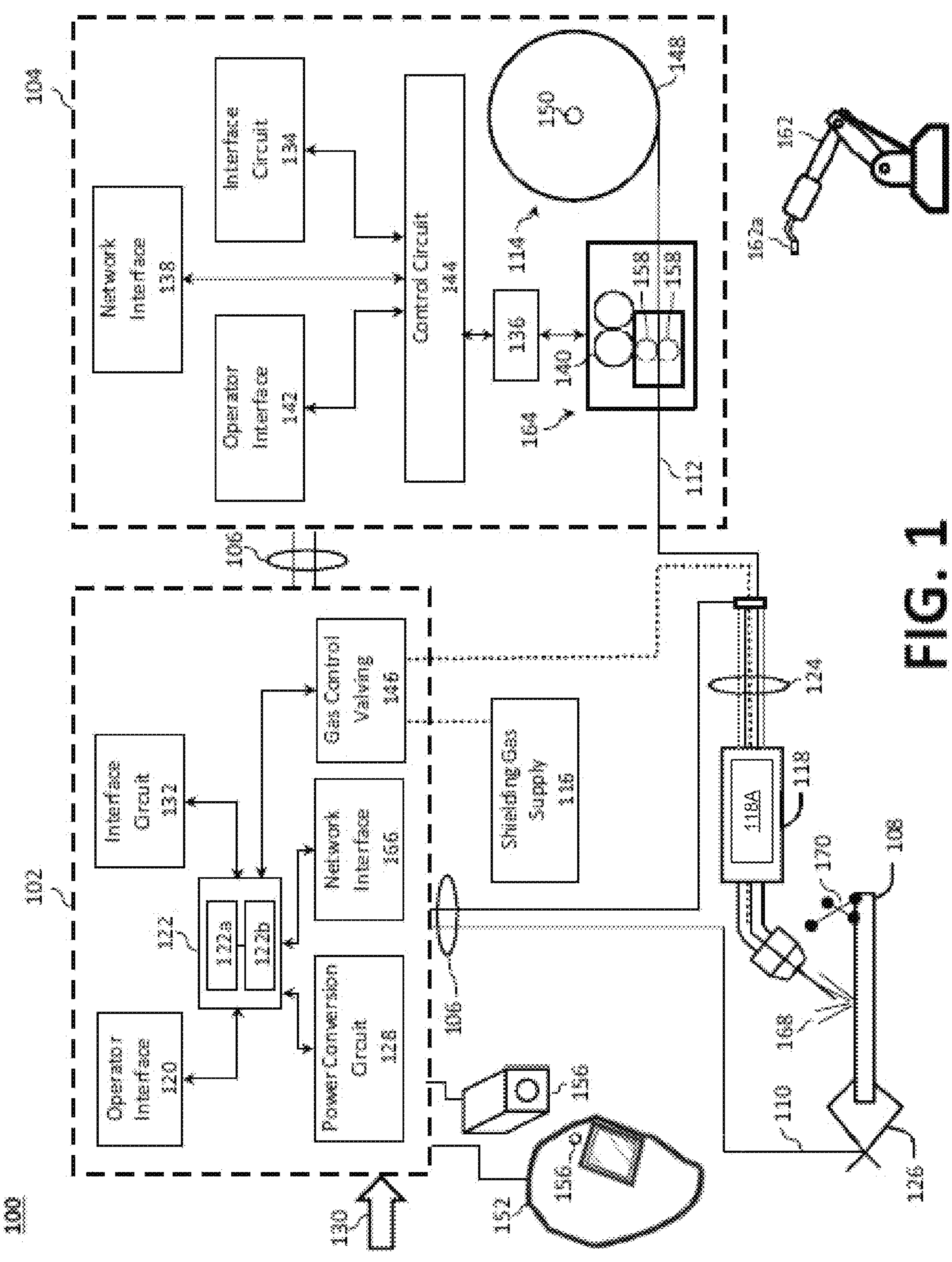

FIG. 1 illustrates an example welding system, in accordance with aspects of this disclosure.

Figure 2A:
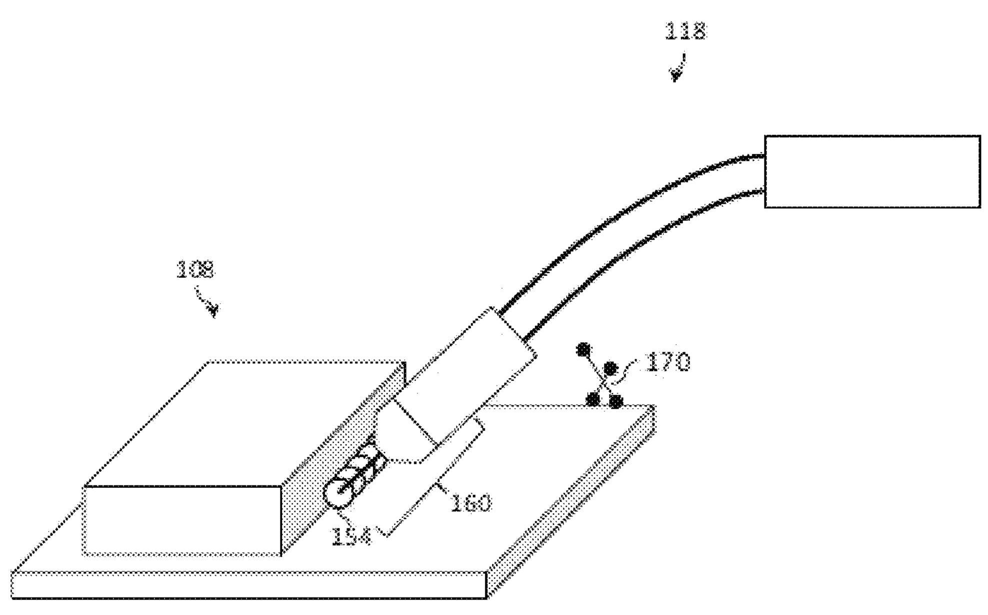

FIG. 2*a* illustrates a weld bead formed using the welding-type system in accordance with an aspect of this disclosure.

Figure 2B:
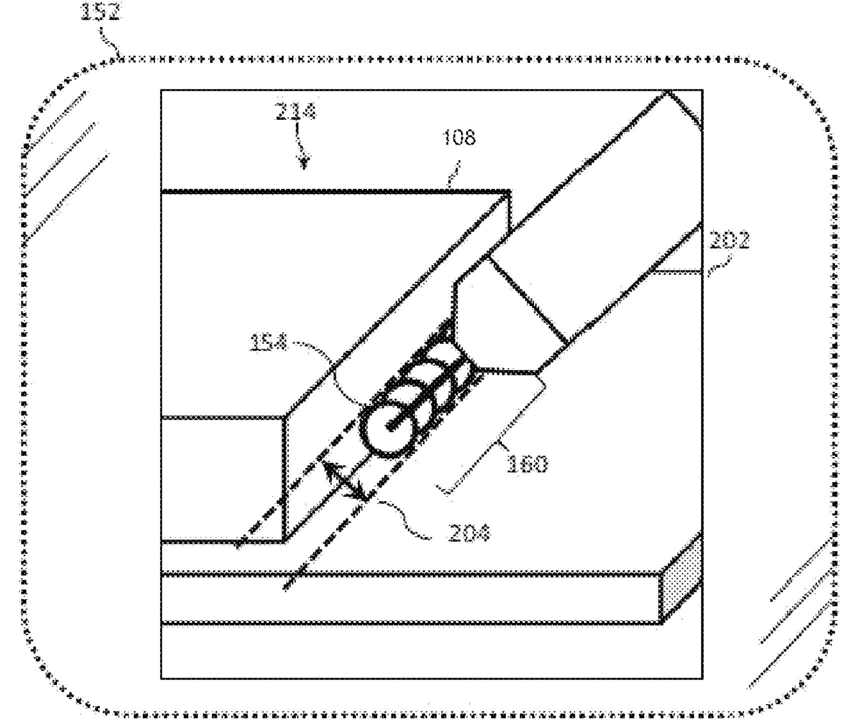

FIG. 2*b* illustrates the interior of example welding headwear in accordance with an aspect of this disclosure.

Figure 2C:
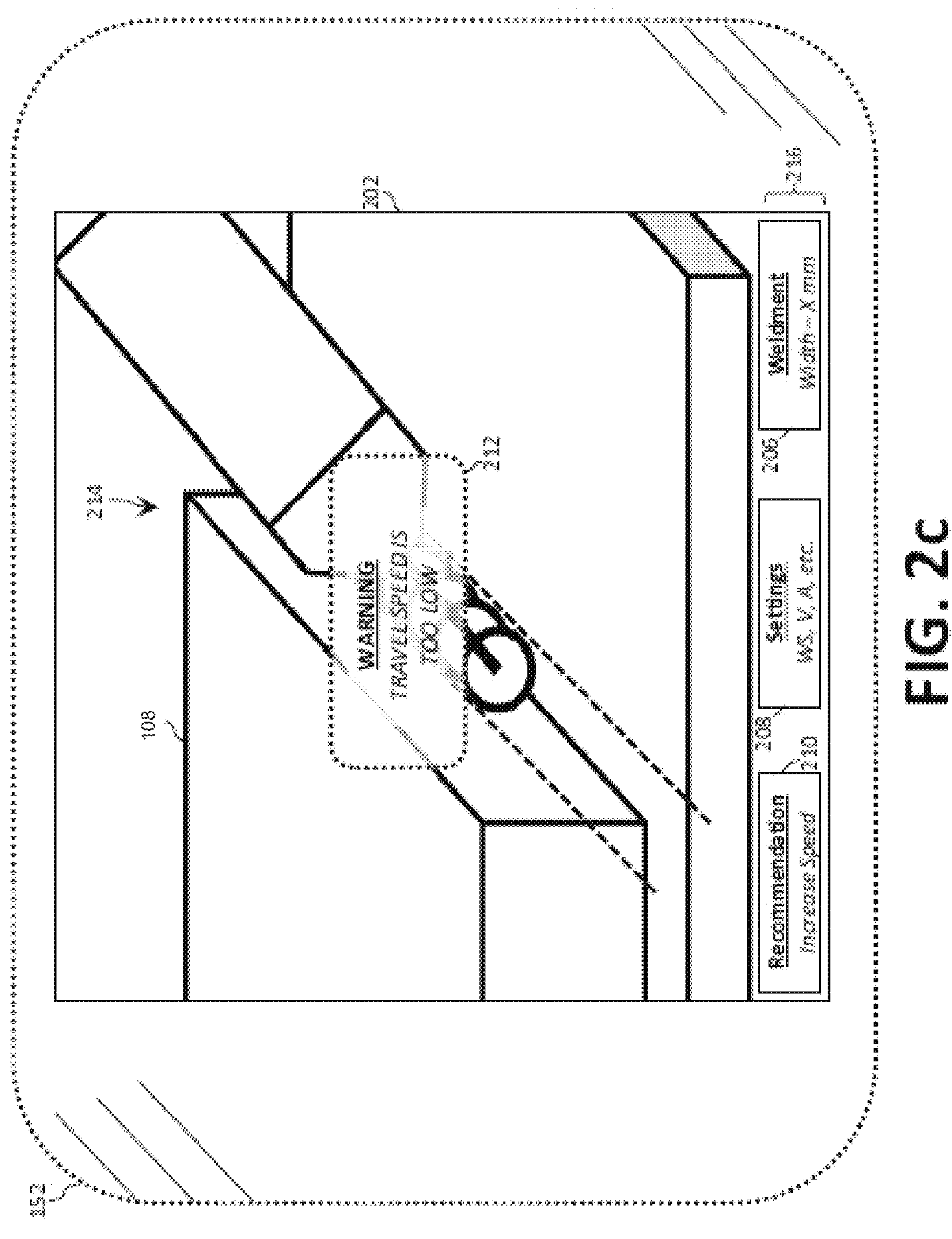

FIG. 2*c* illustrates an example display device of welding headwear displaying welding information in accordance with an aspect of this disclosure.

Figure 3:
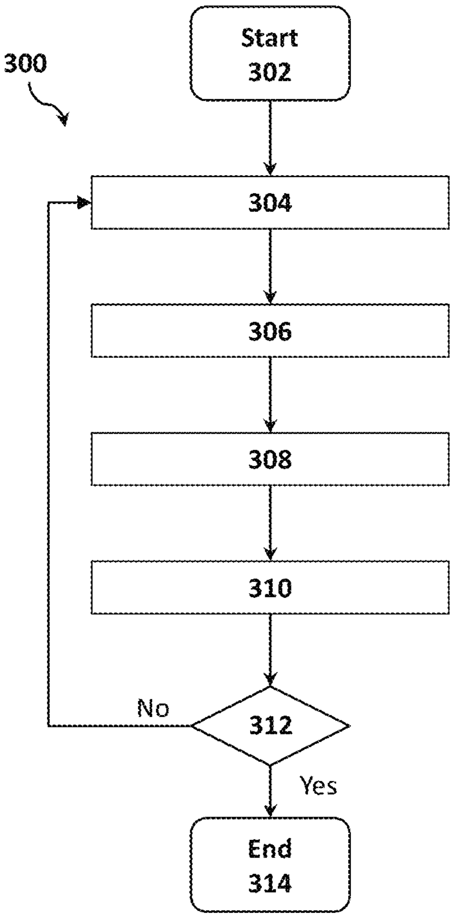

FIG. 3 illustrates an example method to control a welding-type system during a welding operation in accordance with an aspect of this disclosure.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

The term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

The terms "circuit" and "circuitry" includes any analog and/or digital components, power and/or control elements, such as a microprocessor, digital signal processor (DSP), software, and the like, discrete and/or integrated components, or portions and/or combinations thereof.

The terms "control circuit" and "control circuitry," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards, which form part or all of a controller, and are used to control a welding process, a device such as a power source or wire feeder, motion, automation, monitoring, air filtration, displays, and/or any other type of welding-related system.

The term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), flash memory, solid state storage, a computer-readable medium, or the like.

The term "torch," "welding torch," "welding tool," or "welding-type tool" refers to a device configured to be manipulated to perform a welding-related task, and can include a hand-held welding torch, robotic welding torch, gun, or other device used to create the welding arc.

The term "real-time" refers to immediately incorporating feedback into a control system, taking into account filtering or other processing prior to entry or use of the feedback in the control loop.

The term "welding mode," "welding process," "welding-type process," or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), submerged arc welding (SAW), spray, short circuit, and/or any other type of welding process.

The present methods and systems may be realized in hardware, software, and/or a combination of hardware and software. Example implementations include an application specific integrated circuit and/or a programmable control circuit. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

In robotic welding operations, the welding operation can be controlled precisely in terms of speed, angle, position, etc. of the welding torch, but these techniques cannot be easily applied to human operators, who are less predictable and cannot provide physical weld control to the same degree of accuracy or precision as their robotic counterparts. Welding is a skill that can take years, if not decades, to master; therefore, it is advantageous to provide a welding-type system that can monitor a welding work piece in real-time (or near real-time) during a welding operation to automatically account for and/or correct for operator uncertainty (e.g., deviation, operator error, movement, etc.). In one example, the present disclosure relates to systems and methods to monitor and control a welding process in real-time (or near real-time) based on one or more weld attributes, such as a weld pool measurement (e.g., width or depth of depression). In some examples, such as the case with unskilled welders (e.g., hobbyists, weld trainees, etc.) the welding-type system may provide feedback to the operator to improve the operator's welding performance. For example, the welding-type system may indicate via a display device which welding parameters were, or should be, adjusted and by how much.

According to a first aspect, a welding-type system comprises: power conversion circuitry configured to convert input power to welding-type power for use by a welding torch to form a weld pool; and control circuitry configured to control one or more parameters of the welding-type system during a welding operation based on one or more attributes of the weld pool determined using a sensor configured to capture the one or more attributes of the weld pool.

According to a second aspect, a method to control a welding-type system during a welding operation comprises: controlling, via control circuitry, power conversion circuitry to convert input power to welding-type power for use by a welding torch during the welding operation; capturing, via a sensor, one or more attributes of a weld pool formed using the welding torch during the welding operation; and controlling, via the control circuitry, one or more parameters of the welding-type system during the welding operation based on the one or more attributes of the weld pool.

According to a third aspect, a welding-type system comprises: power conversion circuitry configured to convert input power to welding-type power for use by a welding torch to form a weld pool; and control circuitry configured to control one or more parameters of the welding-type system during a welding operation to maintain the width of the weld pool at a target width value during the welding operation.

The one or more attributes may include a width of the weld pool and/or a depth of depression in weld pool. In certain aspects, the sensor is a camera, such as optical sensor or an infrared sensor, which may be ruggedized and fixed to welding headwear, the welding torch, or elsewhere in the weld cell.

In certain aspects, the one or more parameters of the welding-type system is a wire-feeding speed and the control circuitry is configured to adjust a wire-feeding speed of a wire feeder to maintain the width of the weld pool at a target width value by increasing the wire-feeding speed if the width of the weld pool is less than a threshold width value and decreasing the wire-feeding speed if the width of the weld pool is greater than the threshold width value.

In certain aspects, the one or more parameters of the welding-type system is an output current and the control circuitry is configured to adjust the output current of the welding-type power via the power conversion circuitry to maintain the width of the weld pool at a target width value by increasing the output current if the width of the weld pool is less than a threshold width value and decreasing the output current if the width of the weld pool is greater than the threshold width value.

In certain aspects, the welding-type system is an automated welding-type system having an actuator that controls a travel speed of the welding torch during the welding operation and the one or more parameters of the welding-type system is the travel speed, wherein the control circuitry is configured to control the actuator to adjust the travel speed to maintain the width of the weld pool at a target width value by decreasing the travel speed if the width of the weld pool is less than a threshold width value and increasing the travel speed if the width of the weld pool is greater than the threshold width value.

FIG. 1 illustrates an example welding-type system 100 for performing welding-type operations on a welding work piece 108. As illustrated, the welding-type system 100 generally comprises a power supply 102, a welding torch 118, a wire feeder 104, and one or more sensors 156, which may be coupled via conductors or conduits 106. The disclosed welding-type system 100 provides improved weld quality/consistency and ease of use by unskilled operators. The welding-type system 100 could be used for GMAW, GTAW, FCAW, SAW, and/or any other manual, semi-automatic, mechanized, or automated welding process.

The welding-type system 100 is configured to provide welding wire 112 (electrode wire) from a welding wire source 114, power from the power supply 102, and shielding gas from a shielding gas supply 116 through the welding cable 124, to a welding torch 118. To that end, terminals may be provided on the power supply 102 and/or on the wire feeder 104 to allow the conductors or conduits 106 to be coupled within the welding-type system 100 to allow for power and gas to be provided to the wire feeder 104 from the power supply 102, and to allow data to be exchanged between the devices. In some example, data may be exchanged between the devices via the conductors/conduits 106 or wirelessly.

While the welding-type system 100 will be generally described as having a consumable electrode (e.g., a GMAW system having a consumable welding wire 112 as the electrode), the principles of the subject disclosure may be applied to welding-type systems 100 that use a non-consumable electrode. In a GTAW system, for example, a non-consumable electrode is used to generate an arc between the non-consumable electrode and the welding work piece 108 to form the weld pool 154. A filler material may be fed or otherwise added to the weld pool 154 during a welding operation.

The power supply 102 generally comprises a control circuitry 122, an operator interface 120, interface circuit 132, power conversion circuitry 128, network interface 166, and one or more gas control valves 146. While the various components may be provided in a single enclosure, one or more components of the power supply 102 may be provided outside the enclosure.

The control circuitry 122, operates to control generation of welding power output that is supplied to the welding wire 112 (e.g., electrode wire) for carrying out the desired welding operation. The control circuitry 122 includes one or more controller(s) and/or processor(s) 122*a* that controls the operations of the power supply 102. The control circuitry 122 receives and processes multiple inputs associated with the performance and demands of the system. The processor(s) 122*a* may include one or more microprocessors, such as one or more "general-purpose" microprocessors, one or more special-purpose microprocessors and/or application-specific integrated circuit (ASICs), one or more microcontrollers, and/or any other type of processing and/or logic device. For example, the control circuitry 122 may include one or more digital signal processors (DSPs). The control circuitry 122 may include circuitry such as relay circuitry, voltage and current sensing circuitry, power storage circuitry, and/or other circuitry, and is configured to sense the primary power received by the power supply 102 and the power (e.g., welding-type power) supplied by the power supply 102.

The example control circuitry 122 includes one or more memory device(s) 122*b*. The memory device(s) 122*b* may include volatile and/or nonvolatile memory and/or storage devices, such as random access memory (RAM), read only memory (ROM), flash memory, hard drives, solid state storage, and/or any other suitable optical, magnetic, and/or solid-state storage mediums. The memory device 122*b* stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a work piece, a voltage, a current, welding device settings, and so forth. The memory device 122*b* may store machine executable instructions (e.g., firmware or software) for execution by the processor(s) 122*a*. Additionally or alternatively, one or more control schemes for various welding processes, along with associated settings and parameters, may be stored in the memory device 122*b*, along with machine executable instructions configured to provide a specific output (e.g., initiate wire feed, enable gas flow, capture welding current data, detect short circuit parameters, determine amount of spatter) during operation. For example, the memory device 122*b* may store executable instructions configured to monitor one or more weld attributes (e.g., such as a weld pool measurements captured via one or more sensors 156) and to adjust one or more control schemes dynamically (e.g., real-time or near real-time) during a welding process.

The control circuit 122 is coupled to power conversion circuitry 128. This power conversion circuitry 128 is adapted to convert the input power 130 from a source of electrical power as indicated by arrow to output welding-type power, such as the waveforms applied to the welding wire 112 at the welding torch 118. The power applied to the power conversion circuitry 128 may originate in the power grid (e.g., mains power), although other sources of power may also be used, such as power generated by an engine-driven generator, batteries, fuel cells, and/or other alternative sources. In some examples, the power received by the power conversion circuitry 128 is an AC voltage between approximately 110V and 575V, between approximately 110V and 480V, or between approximately 110V and 240V. Various power conversion circuits may be employed, including choppers, boost circuitry, buck circuitry, inverters, converters, and/or other switched mode power supply circuitry, and/or any other type of power conversion circuits. The example power conversion circuitry 128 may implement one or more controlled voltage control loop(s), one or more controlled current control loop(s), one or more controlled power control loops, one or more controlled enthalpy control loops, and/or one or more controlled resistance control loops to control the voltage and/or current output.

The welding-type system 100 is configured for weld settings (e.g., weld parameters, such as voltage, wire feed speed, current, gas flow, inductance, physical weld parameters, advanced welding programs, pulse parameters, etc.) to be selected by the operator and/or a welding sequence, such as via an operator interface 120 provided on the power supply 102. The weld settings may also be automatically adjusted dynamically by the control circuit 122 during a welding operation, for example, based on one or more weld attributes.

The operator interface 120 may receive inputs using any input device, such as via a keypad, keyboard, buttons, touch screen, voice activation system, wireless device, foot pedal, etc. The operator interface 120 will typically be incorporated into a front faceplate of the power supply 102, and may allow for selection of settings such as the weld process, the type of wire to be used, voltage and current settings, and so forth. In particular, the example welding-type system 100 is configured to allow for welding with various steels, aluminums, or other welding wire that is channeled through the welding torch 118. These weld settings are communicated to a control circuitry 122 within the power supply 102. The system may be particularly adapted to implement welding regimes configured for certain electrode types.

The operator interface 120 may receive inputs specifying wire material (e.g., steel, aluminum), wire type (e.g., solid, cored), wire diameter, gas type, and/or any other parameters. Upon receiving the input, the control circuitry 122 determines the welding output for the welding application. For example, the control circuitry 122 may determine weld voltage, weld current, wire feed speed, inductance, weld pulse width, relative pulse amplitude, wave shape, preheating voltage, preheating current, preheating pulse, preheating resistance, preheating energy input, and/or any other welding and/or preheating parameters for a welding process based at least in part on the input received through the operator interface 120.

The power supply 102 illustrated may also include an interface circuit 132 configured to allow the control circuit 122 to exchange signals with the wire feeder 104, the one or more sensors 156, and/or welding headwear 152. The power supply 102 may comprise a network interface 166 configured to communicate data (e.g., measurements, commands, etc.) with another device; whether a remote server, computer, the wire feeder 104 (via its network interface 138), the one or more sensors 156, and/or the welding headwear 152.

The welding torch 118 may be any type of arc welding torch, (e.g., GMAW, GTAW, FCAW, SMAW, etc.) and may allow for the feed of a welding wire 112 (e.g., an electrode wire) and gas to a location adjacent to a welding work piece 108.

A work cable 110 is coupled to the power supply 102 and the welding work piece 108 to complete an electrical circuit between the power supply 102 and the welding work piece 108 via a work clamp 126 for maintaining the welding arc 168 during the welding operation. The welding-type power may pass from the power conversion circuitry 128 to the welding wire 112 at the end of the welding torch 118, through the welding work piece 108, and back to the power conversion circuitry 128 via the work cable 110 and work clamp 126 to maintain the welding arc 168.

When the welding arc 168 exists between the welding wire 112 and the welding work piece 108, an electrical circuit is completed and the welding power flows, depending on polarity, through the welding wire 112, across the welding arc 168, across the welding work piece(s) 108, and returns to the power conversion circuitry 128 via the work cable 110 and work clamp 126. When polarity is reversed, the current flow direction is reversed. Therefore, the work cable 110 and work clamp 126 allow for closing an electrical circuit from the power supply 102 (e.g., the power conversion circuitry 128) through the welding work piece 108. During a welding operation, the welding wire 112 becomes part of the weld pool 154 to form a weld bead 160.

When configured for manual or semi-automatic operation whereby a human operator manipulates the position and/or angle of the welding wire 112 via the welding torch 118. The welding wire 112 may be provided via a handheld welding torch 118. A trigger on the handheld welding torch 118 enables the human operator to start and stop supply of welding-type power to the welding torch 118, though a foot pedal may also be connected to the welding-type system 100 via the operator interface 120 or the control circuitry 122 via, for example, a conduit and/or electrical connecter (e.g., a plug). A foot pedal may be useful in GTAW welding systems.

In some examples, whether manual, semi-automatic, or fully automatic operation, the welding wire 112 may be dispensed from a source (e.g., a wire source, such as a spool) via a wire feeder 104. The wire feeder 104 includes components for feeding wire to the welding torch 118 and thereby to the welding operation, under the control of control circuit 144. A wire spool 148 is mounted on a spool hub 150 and configured to rotate relative to a structure via the spool hub 150. While the power supply 102 and wire feeder 104 are illustrated as separate systems, the power supply 102 and wire feeder 104 may be provided as a single system and/or in a single enclosure.

During welding operations, the welding wire 112 is advanced through a jacket of the welding cable 124 towards the welding torch 118 via the wire feeder 104. In one example, the wire feeder 104 may comprise a drive roll assembly 164 that is driven by a wire feeder motor 140 (e.g., an electric motor) and drive rollers 158. In some examples, the wire feeder motor 140 is configured to control the direction and speed (i.e., wire feed speed) of the welding wire 112 being supplied, for example, to the weld pool 154. The wire feeder motor 140 may be controlled by the control circuitry 122 as a function of one or more welding parameters, such voltage, current, bead size, pool width, travel speed, etc. To that end, the wire feeder motor 140 may be configured to provide feedback to the control circuitry 122 (e.g., motor position, speed, direction, etc.).

The wire feeder 104 includes a wire feed controller 136 operatively coupled to the welding wire source 114, the wire feeder motor 140, etc. The wire feed controller 136 may comprise a network interface 138, an operator interface 142, an interface circuit 134, and a control circuit 144. The wire feeder 104 also includes control circuit 144 coupled to the interface circuit 134. As described below, the control circuit 144 allows for wire feed speeds to be controlled in accordance with operator selections and/or stored sequence instructions, and permits these settings to be fed back to the power supply 102 via the interface circuit 134. The control circuit 144 is coupled to an operator interface 142 on the wire feeder 104 that allows selection of one or more welding parameters, particularly wire feed speed. The operator interface may also allow for selection of such weld parameters as the process, the type of wire utilized, current, voltage or power settings, and so forth. The control circuit 144 may also be coupled to gas control valving 146 which regulates and measures the flow of shielding gas from the shielding gas supply 116 to the welding torch 118 via the conductors or conduits 106. In general, such gas is provided at the time of welding, and may be turned on immediately preceding the weld and for a short time following the weld operation. The shielding gas supply 116 may be provided in the form of pressurized bottles. An inlet of the drive roll assembly 164 is connected to an outlet of the welding wire source 114 via one or more connectors.

While the welding-type system 100 is illustrated for use in a manual operation, the present disclosure may be applied to robotic arc welding systems. In some examples, the welding torch 118 may be part of a robotic arc welding system in which a robotic arm controls the location and operation of the welding wire 112 by manipulating the welding torch 118. In this example, the welding torch 118 may be coupled to the working end 162*a* of the robotic arm 162. Operation of the robotic arm 162 (e.g., various motors, actuators, etc.) and triggering the starting and stopping of the current flow may be controlled by the control circuitry 122 (e.g., rather than a human interface, such as a trigger or foot pedal).

The welding-type system 100 may, for example, be an automated welding-type system 100 having a robotic arm 162 with an actuator that controls a travel speed of the welding torch 118 during the welding operation. In operation, the welding-type system 100 may adjust the travel speed based on readings from the one or more sensors 156, which may provide a weld pool measurement (e.g., width or depth of depression). For example, the travel speed may be decreased if a width of the weld pool 154 is less than a desired width (as indicated by a threshold width value) or increased if the width of the weld pool 154 is greater than the threshold width value. In another example, a separate robotic control circuit may be provided that is configured to control the robotic arm and is communicatively coupled to control circuitry 122 via the interface circuit 132 or the network interface 166.

The wire feeder 104 includes a complimentary interface circuit 134 that is coupled to the interface circuit 132. In some examples, multi-pin interfaces may be provided on both components and a multi-conductor cable run between the interface circuit to allow for such information as wire feed speeds, processes, selected currents, voltages or power levels, and so forth to be set on either the power supply 102, the wire feeder 104, or both. Additionally or alternatively, the interface circuit 134 and the interface circuit 132 may communicate wirelessly and/or via the weld cable.

The one or more sensors 156 may comprise cameras, microphones, voltage sensor, current sensors, etc. For example, the sensor 156 may be, for example, a camera, such as an optical sensor and/or infrared sensor. The sensor(s) 156 (e.g., camera) may be positioned at a fixed location relative to the welding torch 118 or a mobile sensor 156 may be used to measure and collect welding data. The one or more sensors 156 may be provided via, for example, welding headwear 152 or one or more fixed structures positioned throughout the welding station (a/k/a weld cell). The one or more cameras maybe integral with, or coupled to, the welding headwear 152 (e.g., a welding mask or welding helmet). In another aspect, the sensor 156 is fixed to the welding torch 118. As illustrated, for example, the one or more cameras may be positioned with a line of sight to the weld of the welding work piece 108. In some examples, multiple sensors are used to provide different field of view.

The sensor(s) 156 may employ a ruggedized housing to protect the sensor 156 from being damaged during the welding operation. The ruggedized housing may be fabricated from, for example, rubber, plastic, etc.

When the one or more sensors 156 employs a camera, the camera may comprise, for example, one or more lenses, filters, and/or other optical components for capturing electromagnetic waves in the spectrum ranging from, for example, infrared to ultraviolet. In an example implementation, two cameras may be positioned approximately centered with the eyes of a wearer of the welding headwear 152 to capture high dynamic range images (e.g., 140 dB+) and stereoscopic images (at any suitable frame rate ranging from still photos to video at 30 fps, 100 fps, or higher) of the field of view that a wearer of the welding headwear 152 would have if looking through a welding helmet lens. In an example using a microphone, the microphone should be close enough to detect acoustic features of the weld, or weld process, etc.

The weld attributes may be monitored using the one or more sensors 156 with the ability to, for example, measure one or more weld pool measurements of the molten weld pool 154 (e.g., width or depth of depression) while the welding process is active. In operation, the welding output may be adjusted in real-time (or near real-time) based on the weld pool measurement(s) from the one or more sensors 156. The one or more sensors 156 may transmit a signal to the control circuitry 122 to control the output of the welding machine via one or more transmitters, whether wirelessly or over a wired connection. For example, the one or more sensors 156 may wirelessly communicate with the control circuitry 122 using Wi-Fi, Bluetooth, etc.

The control circuitry 122 is configured to calibrate measurement dimensions of the sensor 156 using a target (or other artifact) of known dimension within its field of view. For example, the welding-type system 100 can calibrate the sensor measurement dimensions using a registration target 170 of known dimensions within the field of view of the sensor 156. The registration target may be, for example, a calibration tool (e.g., a jig) having a known shape and dimension. In one example, the calibration tool may comprise a plurality of rods and spheres arranged in a known relationship. In another example, the registration target 170 may be, for example, the welding torch 118 (or portion thereof, such as the nozzle or tip), the welding work piece 108, the welding wire 112, etc. For example, where the make, model, and/or type of welding torch 118 is known, its shape and dimensions may be used as a reference measurement as the dimensions would be known. The registration target 170 may be set via the operator interface 120. For example, the operator may identify, set, and/or indicate, via the operator interface 120, the registration target 170 and any associated information. In one example, the operator may identify the location of the registration target 170 within field of view. In another example, the control circuitry 122 may automatically detect the registration target 170 (e.g., but comparing the field of view to known images of registration targets 170).

FIG. 2*a* illustrates a weld bead 160 formed using the welding-type system 100 in accordance with one aspect of this disclosure. As illustrated, the welding torch 118 forms a molten weld pool 154 on the welding work piece 108. As the welding torch 118 travels along the welding work piece 108, the molten weld pool 154 moves and forms a trail of solidified metal in the form of a weld bead 160. As can be appreciated, the weld pool measurements (e.g., width or depth of depression) of the molten weld pool 154, together with other parameters such as travel speed and wire feed speed, dictates the size and shape of the resulting weld bead 160. The various welding parameters ought to be carefully monitored and controlled to provide a desired weld bead 160 for a given welding operation. For example, a narrow and/or clumpy weld bead 160 may result in a weak joint, whereas a thick weld bead 160 wastes material, power, and time, while also resulting in a messy or unattractive weld that may be unacceptable in the final product.

The weld pool 154 and/or weld bead 160 may be monitored using the one or more sensors 156 during the welding operation. In one example, the one or more sensors 156 can be embedded in the welding headwear 152 used by an operator performing a manual, semi-automatic, or mechanized welding operation. The one or more sensors 156 may be oriented such that the weld pool 154 and/or weld bead 160 of the welding work piece 108 are in the field of view, along with the registration target 170. While the registration target 170 is illustrated as a calibration tool, the other structures can serve as the registration target 170, such as the welding work piece 108 or the welding torch 118 itself.

FIG. 2*b* illustrates an interior view of example welding headwear 152 in accordance with one aspect of this disclosure. As illustrated, the welding headwear 152 may include a display device 202 on the interior surface of the welding headwear 152 and aligned with the operator eyes when worn. The display device 202 may be configured to display a scene 214 of the welding operation and/or information relating to the welding operation. In other words, the operator is able to observe the weld pool 154 and/or weld bead 160 during the welding operation, as well as other information relating to the welding operation. For example, the display device 202 may provide an auto-darkening filter with a head up display (HUD), liquid crystal display (LCD), organic light-emitting diode (OLED or organic LED) display, etc. In certain aspects, rather than an auto-darkening filter, the scene 214 of the welding operation may be captured via the one or more sensors 156, such as those mounted to the welding headwear 152, and displayed via the display device 202.

During a welding operation, the one or more sensors 156 are oriented to observe the weld pool 154 and/or weld bead 160. The sensor data (e.g., image data) may be communicated to the control circuitry 122 (or another controller) and used to determine weld pool measurements, such as a weld-pool width 204 and/or a depth of depression in weld pool 154. The control circuitry 122 may determine the weld-pool width 204, for example, using shape recognition techniques identifying the weld pool 154 within the image and identifying the tangent points. The weld-pool width 204 may be calculated by determining the number of pixels between the tangent points, which may be converted to standard or metric units by comparing it to the registration target 170, for example.

The weld pool measurements of the weld pool 154, which affects the quality and size of the weld bead 160, can be used to indicate if and when one or more welding parameters should be adjusted. To that end, the welding-type system 100 may automatically adjust one or more welding parameters of the welding-type system 100 to adjust the size (e.g., width and depth) of the weld pool 154. The weld-pool width 204 may be adjusted by controlling various welding parameters, such as current (GTAW or SMAW), wire feed speed (GMAW or FCAW), travel speed (mechanized or automated process including GMAW, GTAW, FCAW, LBW, or EBW), etc.

For example, if the weld-pool width 204 is too high (i.e., the weld pool 154 is too large), the welding-type system 100 may determine that the travel speed is too slow and a signal can be sent to the welding-type system 100 to reduce the wire feed speed via the wire feeder 104. Similarly, if the weld pool 154 width is too low (i.e., the weld pool 154 is too small), the welding-type system 100 may determine that the travel speed is too fast. In this case a signal may be sent to the welding-type system 100 to increase the wire feed speed via the wire feeder 104.

In one example, a welding-type system 100 comprises power conversion circuitry 128 and control circuitry 122. The power conversion circuitry 128 configured to convert input power 130 to welding-type power for use by a welding torch 118 to form a weld pool 154. The control circuitry 122 configured to control one or more parameters of the welding-type system 100 during a welding operation based on one or more attributes of the weld pool 154 determined using a sensor 156 configured to capture the one or more attributes of the weld pool 154. The one or more attributes may include, for example, a width and/or a depth of depression in weld pool 154.

In some examples, the one or more parameters is a wire-feeding speed or the output current and the control circuitry 122 is configured to adjust the wire-feeding speed via the wire feeder 104 and/or to adjust the output current of the welding-type power via the power conversion circuitry 128 to maintain the width 204 of the weld pool 154 at a target width value.

In one example, the control circuitry 122 may be configured to increase the wire-feeding speed if the width 204 of the weld pool 154 is less than the threshold width and decrease the wire-feeding speed if the width 204 of the weld pool 154 is greater than the threshold width. In another example, the control circuitry 122 may be configured to increase the output current if the width 204 of the weld pool 154 is less than the threshold width value and decrease the output current if the width 204 of the weld pool 154 is greater than the threshold width value.

The threshold width (or threshold range), which represented a desired pool/bead which, may be set by the operator via the operator interface 120 depending on the welding operation. For example, the operator may input, via the operator interface 120, whether a small, medium, or large weld pool 154 is desired. The welding-type system 100 may then apply a pre-set width associated with the selected one of the small, medium, or large settings. In another example, the operator may input, via the operator interface 120, a designed width in standard or metric unites (e.g., 1 cm).

In a robotic arc welding system, the welding-type system 100 may instead control movement of the working end 162*a* of the robotic arm 162 to adjust travel speed. For example, where the welding-type system 100 is an automated welding-type system 100 having an actuator that controls a travel speed of the welding torch 118 during the welding operation, the one or more parameters of the welding-type system 100 is the travel speed and the control circuitry 122 is configured to adjust the travel speed to maintain the width 204 of the weld pool 154 at a target width value. In this case, the control circuitry 122 may be configured to decrease the travel speed if the width 204 of the weld pool 154 is less than a threshold width value and increase the travel speed if the width 204 of the weld pool 154 is greater than the threshold width value.

FIG. 2*c* illustrates an example display device 202 of welding headwear 152 displaying welding information in accordance with one aspect of this disclosure. In addition to providing a real-time scene 214 of the welding operation (whether via a lens or a video feed), the display device 202 may provide information to the operator during the welding operation via one or more information regions 216 (e.g., smaller windows, image/text overlays, etc.). For example, as illustrated, the information regions 216 may include a weldment region 206, a settings region 208, and a recommendation region 210.

The weldment region 206 may provide real-time measurements relating to the welding work piece 108, such as the weld-pool width 204, the arc-on time, a length of the weld bead 160, distance between the welding work piece 108 and the welding torch 118, torch angle, etc. The distance or angle between the welding work piece 108 and the welding torch 118 may be determined optically via the one or more sensors 156. A signal or message may be provided to the operator via the operator interface 120 (or the display device 202 of the welding headwear 152) and/or a haptic feedback device 118A mounted to the welding torch 118 (depicted in FIG. 1) to encourage the operator to adjust the distance, angle, etc.

The settings region 208 may provide the current operating parameters, such as voltage, amperage, wire feed speed, travel speed, etc. The travel speed may be determined via the one or more sensors 156 (e.g., through optical flow processing or proximity-based devices, such as NFC, RFID, etc.) or, in the case of a robotic arc welding system, through feedback from the actuators of the robotic arm 162 itself.

The recommendation region 210 may provide to the operator real-time suggestions relating to the welding operation. For example, as part of training the operator, the welding-type system 100 may instruct to operator to change the travel speed, orientation/distance of the welding torch 118, etc. based on the weld pool measurements from the one or more sensors 156. In some example, the welding-type system 100 may display a recommendation and allow the operator a predetermined amount of time to respond before taking automatic corrective action. For example, when the weld-pool width 204 is too large, the welding-type system 100 may display a message to increase the travel speed via the recommendation region 210 of the display device 202. If the operator doesn't comply by increasing the travel speed (or take other corrective measures to address the weld-pool width 204) within a period of time (e.g., 1 to 10 seconds), then the welding-type system 100 may intervene and automatically slow the wire feed speed to reduce the weld-pool width 204.

The information regions 216 may be positioned along the bottom edge of the display device 202 as illustrated so as to not obstruct the real-time scene 214; though other locations on the display device 202 are contemplated, such as top edge, left/right sides, corners, etc. A highly important message (e.g., warnings, alerts, etc.), for example, may be displayed at the center of the display device 202 as a popup window 212. For example, if the control circuitry 122 determines an error has occurred or the operator has not complied with a recommendation within an allotted time period, a popup window 212 may appear to draw the attention of the operator. The popup window 212 may be provided as flashing text, icons, etc. The popup window 212 mays have a transparent or semi-transparent background color to enable the operator to still see the real-time scene 214.

FIG. 3 illustrates an example method 300 to control a welding-type system 100 during a welding operation. The method 300 starts at step 302 upon, for example, initiation of the welding operation (e.g., upon actuating the trigger or foot pedal).

At step 304, the welding-type system 100 controls, via control circuitry 122, power conversion circuitry 128 to convert input power 130 to welding-type power for use by a welding torch 118 during the welding operation.

At step 306, the welding-type system 100 captures, via a sensor 156, one or more attributes of a weld pool 154 formed using the welding torch 118 during the welding operation. For example, the sensor 156 may capture and provide weld pool measurements to the control circuitry 122 in real-time or near real-time for processing.

At step 308, the welding-type system 100 determines, via control circuitry 122, whether the one or more attributes of the weld pool 154 deviates from a threshold value or range. For example, the control circuitry 122 may determine whether the weld pool measurements fall within threshold range. For example, the one or more attributes may include a width 204 of the weld pool 154.

At step 310, the welding-type system 100 controls or adjust, via the control circuitry 122, one or more parameters of the welding-type system 100 during the welding operation based on the one or more attributes of the weld pool 154. In this case, the welding-type system 100 may increase or decrease the wire-feeding speed and/or the output current to adjust the width 204 of the weld pool 154. The welding-type system 100 may also provide status updates to the operator via a remove device or the information regions 216 of the display device 202.

At step 312, the welding-type system 100 determines, via control circuitry 122, whether the welding operation has terminated. If the operation has terminated (e.g., the trigger or foot pedal is released), the method 300 ends at step 314; otherwise the process returns to step 304 to repeat the process.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:

power conversion circuitry configured to convert input power to welding-type power for use by a welding torch to form a weld pool;

control circuitry configured to control one or more parameters of the welding-type system during a welding operation based on one or more attributes of the weld pool determined using a sensor configured to capture the one or more attributes of the weld pool; and a display device, wherein:

the control circuitry is configured to determine, based on sensory data obtained by the sensor, weld pool measurements relating to at least one attribute of the weld pool;

the control circuitry is configured to control the display device to display to an operator, during the welding operation, a real-time scene of the welding operation and a popup window over said real-time scene;

the control circuitry is configured to control the popup window to display an instruction that adjusts at least one of the one or more parameters to the operator, and to determine the instruction based on the weld pool measurements;

the control circuitry is configured to, in response to determining that the operator has not complied with the instruction to adjust the at least one of the one or more parameters within a predetermined amount of time, take automatic corrective action to adjust the at least one of the one or more parameters based on the weld pool measurements; and the popup window is at least partially transparent or semi-transparent to enable an operator to view the real-time scene.

2. The welding-type system of claim 1, wherein the one or more attributes includes a width of the weld pool.

3. The welding-type system of claim 2, wherein the one or more parameters is a wire-feeding speed and the control circuitry is configured to adjust the wire-feeding speed to maintain the width of the weld pool at a target width value.

4. The welding-type system of claim 3, wherein the control circuitry is configured to increase the wire-feeding speed if the width of the weld pool is less than a threshold width or to decrease the wire-feeding speed if the width of the weld pool is greater than the threshold width.

5. The welding-type system of claim 2, wherein the one or more parameters of the welding-type system is an output current and the control circuitry is configured to adjust the output current of the welding-type power via the power conversion circuitry to maintain the width of the weld pool at a target width value.

6. The welding-type system of claim 5, wherein the control circuitry is configured to increase the output current if the width of the weld pool is less than a threshold width value or to decrease the output current if the width of the weld pool is greater than the threshold width value.

7. The welding-type system of claim 2, wherein:

the welding operation is a live arc welding operation; and the welding-type system is an automated welding-type system having an actuator that controls a travel speed of the welding torch during the live arc welding operation and the one or more parameters of the welding-type system is the travel speed, wherein the control circuitry is configured to adjust the travel speed to maintain the width of the weld pool at a target width value.

8. The welding-type system of claim 7, wherein the control circuitry is configured to decrease the travel speed if the width of the weld pool is less than a threshold width value or to increase the travel speed if the width of the weld pool is greater than the threshold width value.

9. The welding-type system of claim 1, wherein the one or more attributes includes a depth of depression in weld pool.

10. The welding-type system of claim 1, wherein the sensor is an optical sensor.

11. The welding-type system of claim 1, wherein the sensor is an infrared sensor.

12. The welding-type system of claim 1, wherein the sensor is fixed to welding headwear of an operator of the welding-type system.

13. The welding-type system of claim 1, wherein the sensor is fixed to the welding torch.

14. The welding-type system of claim 1, wherein the sensor is configured to calibrate measurement dimensions using a target of known dimension within its field of view.

15. The welding-type system of claim 1, wherein the sensor comprises a ruggedized housing to protect the sensor.

16. A method to control a welding-type system during a live are welding operation, the method comprising:

controlling, via control circuitry, power conversion circuitry to convert input power to welding-type power for use by a welding torch during the live arc welding operation;

capturing, via a sensor, one or more attributes of a weld pool formed using the welding torch during the live arc welding operation;

determining, via the control circuitry, based on sensory data obtained via the sensor, weld pool measurements relating to at least one attribute of the weld pool;

determining, via the control circuitry, based on at least the weld pool measurement, at least one corrective action, wherein the corrective action comprises adjusting at least one parameter of the welding-type system;

providing, to an operator, a recommendation to take the corrective action based on said one or more attributes; and in response to determining that the operator has failed to take the corrective action within a predetermined amount of time, controlling, via the control circuitry, one or more parameters of the welding-type system during the live arc welding operation based on the one or more attributes of the weld pool, wherein the one or more attributes includes a width of the weld pool.

17. The method of claim 16, wherein the one or more parameters of the welding-type system is a wire-feeding speed, the method further comprising the steps of:

increasing wire-feeding speed the wire-feeding speed via a wire feeder if the width of the weld pool is less than a threshold width value; and decreasing the wire-feeding speed if the width of the weld pool is greater than the threshold width value.

18. The method of claim 16, wherein the one or more parameters of the welding-type system is an output current, the method further comprising the steps of:

increasing the output current of the power conversion circuitry if the width of the weld pool is less than a threshold width value; and decreasing the output current if the width of the weld pool is greater than the threshold width value.

19. The method of claim 16, wherein the welding-type system is an automated welding-type system having an actuator that controls a travel speed of the welding torch during the welding operation and the one or more parameters of the welding-type system is the travel speed, the method further comprising the steps of:

decreasing the travel speed if the width of the weld pool is less than a threshold width value; and increasing the travel speed if the width of the weld pool is greater than the threshold width value.

20. A welding-type system, comprising:

power conversion circuitry configured to convert input power to welding-type power for use by a welding torch to form a weld pool;

a sensor configured to capture one or more attributes of the weld pool during a live are welding operation conducted by an operator and transmit a sensor signal to the control circuitry comprising one or more measured attributes;

an operator interface configured to display alerts an operator to take corrective action based on said one or more measured attributes, wherein the corrective action comprises adjusting at least one parameter of the welding-type system; and control circuitry configured to determine the corrective action based on the sensor signal and to control one or more parameters of the welding-type system during the live arc welding operation to maintain a width of the weld pool at a target width value during the live arc welding operation, the controlling of the one or more parameters comprising:

monitoring the sensor signal to determine one or more weld pool measurements;

determining whether the width of the weld pool deviates from a threshold of the target width value based on the one or more weld pool measurements;

in response to determining that the width of the weld pool deviates from the threshold of the target width value, determining whether the operator has taken the corrective action within a predetermined amount of time; and in response to determining that the operator has not taken the corrective action within the predetermined amount of time, modifying the one or more parameters of the welding-type system based on a difference between the target width value and at least one of the one or more weld pool measurements.

* * * * *